(12) United States Patent
Noda

(10) Patent No.: US 7,277,238 B2
(45) Date of Patent: Oct. 2, 2007

(54) IMAGING LENS ARRAY

(75) Inventor: Sayuri Noda, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 37 days.

(21) Appl. No.: 11/247,914

(22) Filed: Oct. 10, 2005

(65) Prior Publication Data

US 2007/0081259 A1    Apr. 12, 2007

(51) Int. Cl.
*G02B 13/08* (2006.01)
*G02B 9/34* (2006.01)

(52) U.S. Cl. .................................. 359/715; 359/774
(58) Field of Classification Search ............. 359/774, 359/715, 656–660, 714

See application file for complete search history.

(56) References Cited

U.S. PATENT DOCUMENTS 6,900,948 B2 *  5/2005  Sato ........................... 359/715
7,012,765 B2 *  3/2006  Matsui et al. ............... 359/771

* cited by examiner

*Primary Examiner*—Scott J. Sugarman
(74) *Attorney, Agent, or Firm*—Charles E. Baxley

(57) ABSTRACT

An imaging lens array that has stable performance and improved precision, wherein a first lens is a positive meniscus lens with a convex surface facing the object side; a second lens is a negative meniscus lens with a convex surface facing the object side; a third lens is a positive meniscus lens with a convex surface facing image side; and fourth lens is a positive meniscus lens with a convex surface facing the object side. When the second, third and fourth lenses are double-sided aspherical lenses, the respective lenses of the present invention can be ensured to have an appropriate power, it also can minimize error, and improve the image quality.

12 Claims, 9 Drawing Sheets

IMAGING LENS ARRAY

BACKGROUND OF THE INVENTION

1. Field of the Invention

The present invention relates to a small type imaging lens array, and more particularly to an imaging lens array consisted of four lenses that are arranged at predetermined intervals.

2. Description of the Prior Arts

Since the image pick up lens has an increasingly wide range of application, plus the consumer electronic industrial is growing fast, the small image pick-up lens is accordingly found in great demand in different fields, particularly in photographic cell phone, digital camera, or auto's detection system for parking or other purposes.

A photosensitive element for a digital fixed focus lens array is merely of charge coupled device (CCD) type or CMOS type Complementary Metal Oxide Semiconductor, and its light sensitivity will be reduced sharply with the increase of exit angle of the lens. Therefore, the digital fixed focus lens array usually comprises 3-4 pieces of lens. However, this type of lens arrangement still has some technical defects as follows:

First, a first lens of the existing lens arrays is a double convex lens, while a second lens thereof is a double concave lens, and the first and second lenses will have an excessive ability, causing instability to the whole system.

Second, since the first and second lenses are double convex lens and double concave lens, respectively, and they are made of glass and are adhered to each other, plus the outer diameters of the first and second lenses are very small (small lens), the adhering work for adhering them together will not be easy. And as a result, the production cost for making this lens array will be high and the yield rate will be relative low.

The present invention has arisen to mitigate and/or obviate the afore-described disadvantages.

SUMMARY OF THE INVENTION

The primary objective of the present invention is to provide an imaging lens array that has stable performance and improved precision, wherein a first lens is a positive meniscus lens with a convex surface facing the object side; a second lens is a negative meniscus lens with a convex surface facing the object side; a third lens is a positive meniscus lens with a convex surface facing image side; and fourth lens is a positive meniscus lens with a convex surface facing the object side. When the second, third and fourth lenses are double-sided aspherical lenses, the respective lenses of the present invention can be ensured to have an appropriate power, it also can minimize error, and improve the image quality.

The secondary objective of the present invention is to provide an imaging lens array consisted of four lenses, wherein the second, third and fourth lenses are made of plastic material, so that they can be produced more easily and the production cost can be reduced effectively.

The third objective of the present invention is to provide an imaging lens array, wherein all the numerical values of the respective lenses are represented in some unambiguous equations, so it can ensure the performance of the respective lenses.

An imaging lens array in accordance with the present invention comprises, from object side, an aperture, a first lens, a second lens, a third lens and a fourth lens; and wherein the first lens is a positive meniscus lens (or plano-convex lens) with a convex surface facing the object side;

the second lens is a negative meniscus type double-sided aspherical lens with a convex surface facing the object side;

the third lens is a positive meniscus type double-sided aspherical lens with a convex surface facing image side; and the fourth lens is a positive meniscus type double-sided aspherical lens with a convex surface facing the object side.

The present invention will become more obvious from the following description when taken in connection with the accompanying drawings, which show, for purpose of illustrations only, the preferred embodiments in accordance with the present invention.

Table 1 shows the real numerical values of the respective lens of the first embodiment;

Table 2 shows the real numerical values of the respective lens of the second embodiment;

Table 3 shows the real numerical values of the respective lens of the third embodiment;

Table 4 shows the real numerical values of the respective lens of the fourth embodiment;

Table 5 shows the real numerical values of the respective lens of the fifth embodiment;

Table 6 shows the real numerical values of the respective lens of the sixth embodiment;

Table 7 shows the real numerical values of the respective lens of the seventh embodiment;

Table 8 shows the real numerical values of the respective lens of the eighth embodiment;

Table 9 shows the real numerical values of the respective lens of the ninth embodiment;

Table 10 shows the data of the aspherical surface of the respective embodiments; and Table 11 shows the optimized reference value of the equation of the respective embodiments.

DETAILED DESCRIPTION OF THE PREFERRED EMBODIMENTS

Referring to FIGS. 1-9, which show an imaging lens array in accordance with the present invention and comprises, from the object side, an aperture 1, a first lens L1, a second lens L2, a third lens L3, a fourth lens L4, two pieces of flat glass 2, 3 and image-forming plane 4.

The first lens L1 is a positive meniscus lens (or plano-convex lens) with a convex surface facing the object side.

The second lens L2 is a negative meniscus type double-sided aspherical lens with a convex surface facing the object side.

The third lens L3 is a positive meniscus type double-sided aspherical lens with a convex surface facing the image side.

The fourth lens L4 is a positive meniscus type double-sided aspherical lens with a convex surface facing the object side.

The flat glass 2 serves as an infrared filter, and the other flat glass 3 is parallel to the flat glass 2 and serves to protect the solid imaging device. Furthermore, on the image-forming plane 4 are provided CCD, CMOS and other solid imaging devices of the like.

Figure 1:
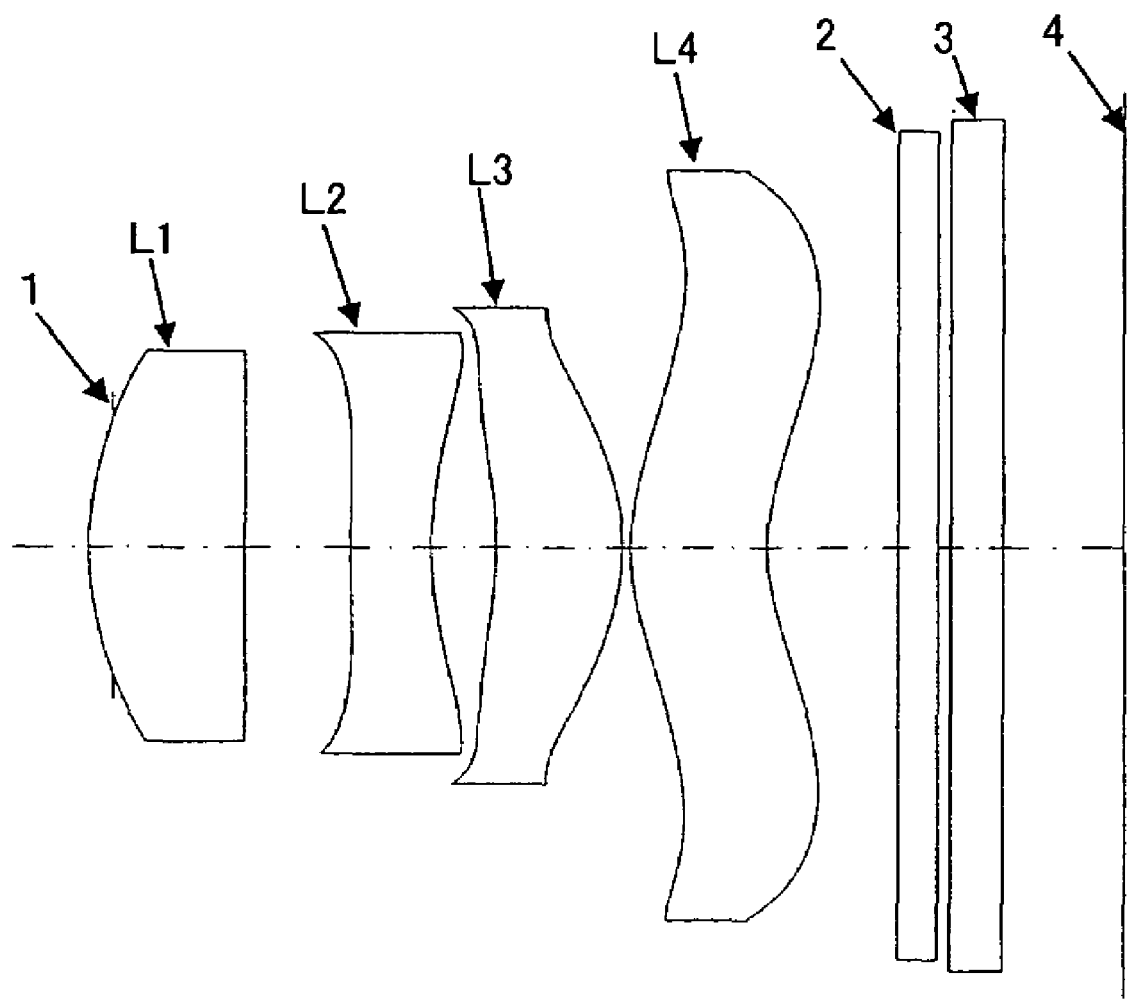
FIG. 1 shows an imaging lens array in accordance with a first embodiment of the present invention.
Figure 2:
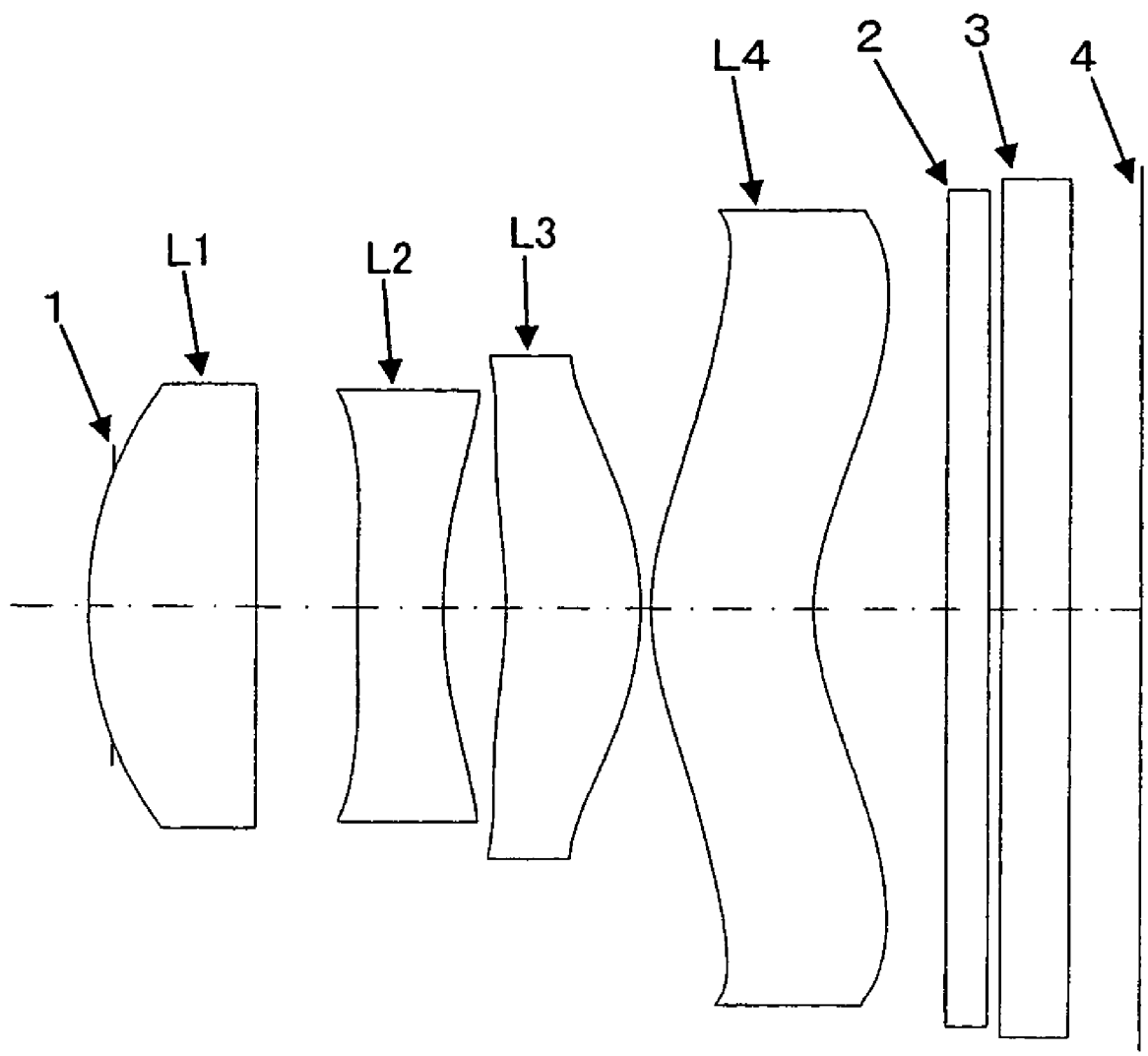
FIG. 2 shows an imaging lens array in accordance with a second embodiment of the present invention.
Figure 3:
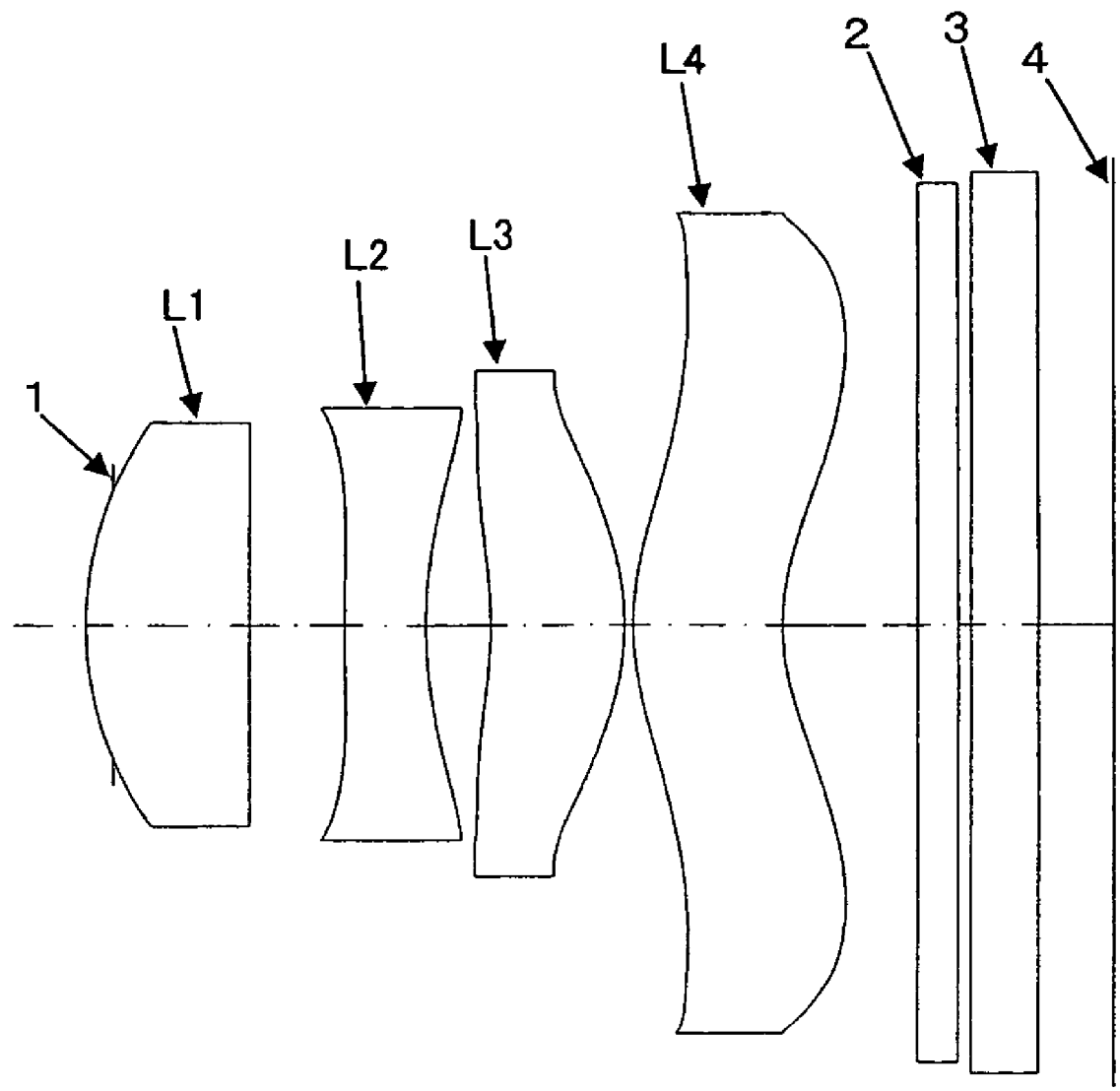
FIG. 3 shows an imaging lens array in accordance with a third embodiment of the present invention.
Figure 4:
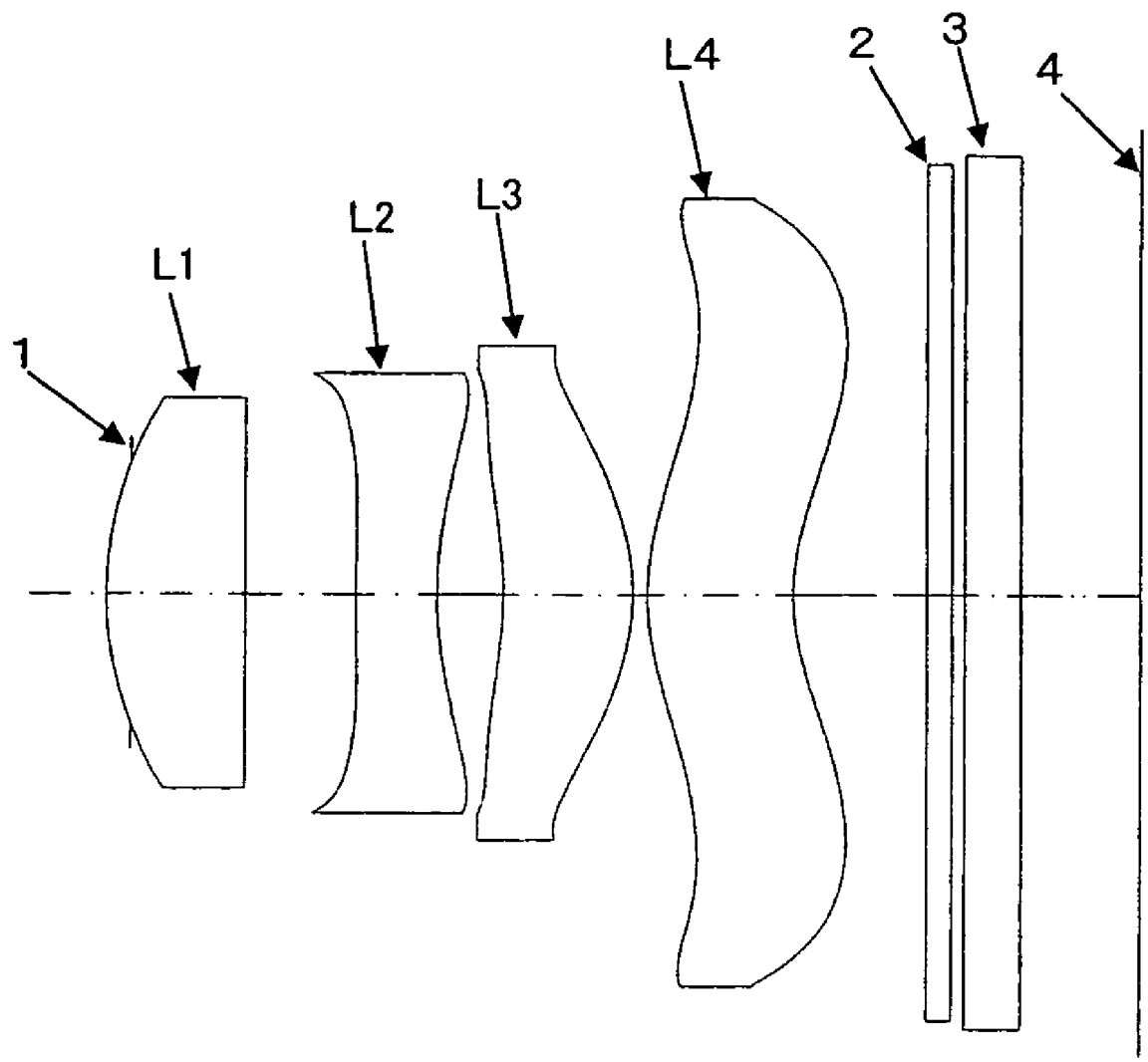
FIG. 4 shows an imaging lens array in accordance with a fourth embodiment of the present invention.
Figure 5:
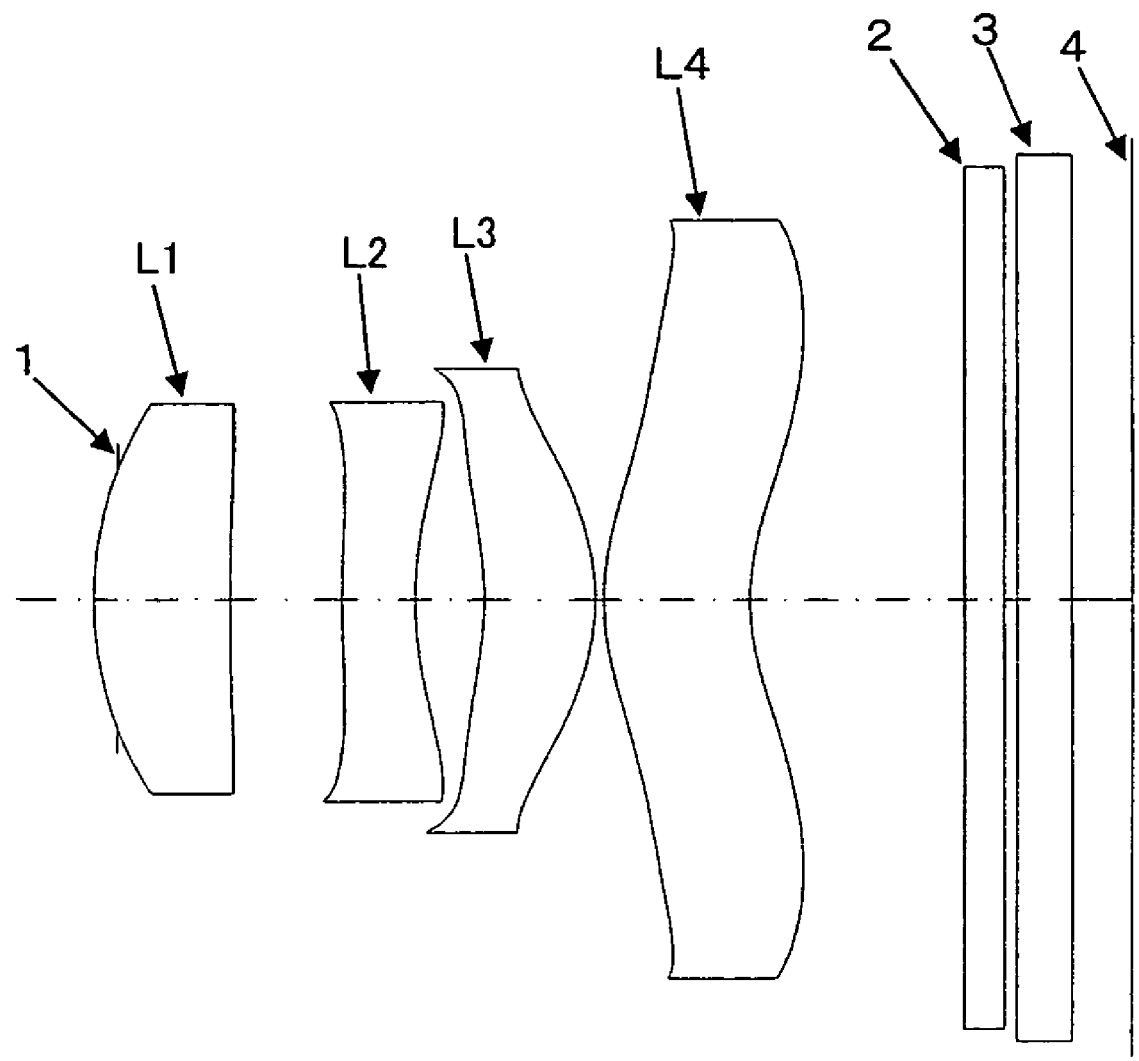
FIG. 5 shows an imaging lens array in accordance with a fifth embodiment of the present invention.
Figure 7:
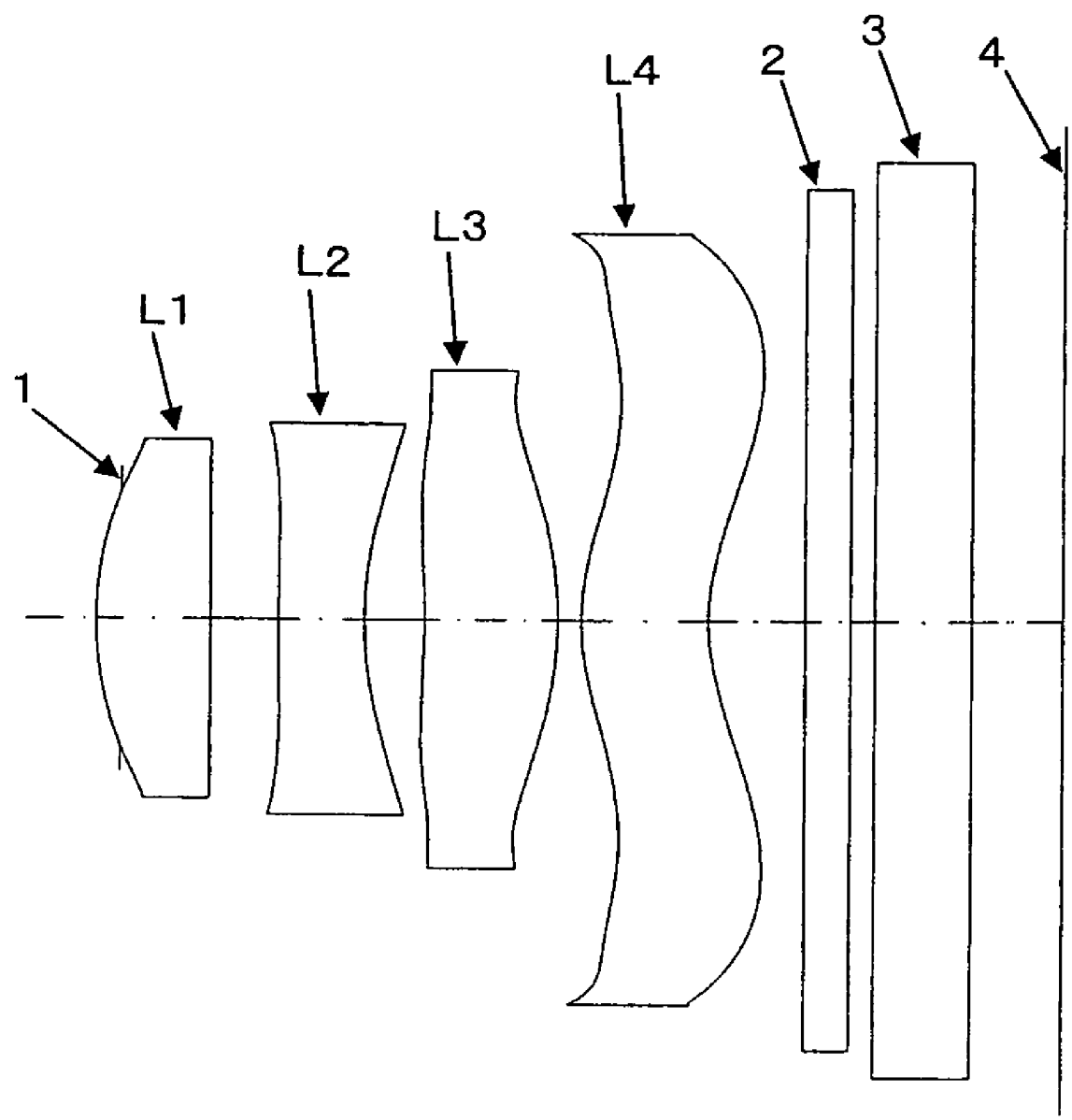
FIG. 7 shows an imaging lens array in accordance with a seventh embodiment of the present invention.
Figure 8:
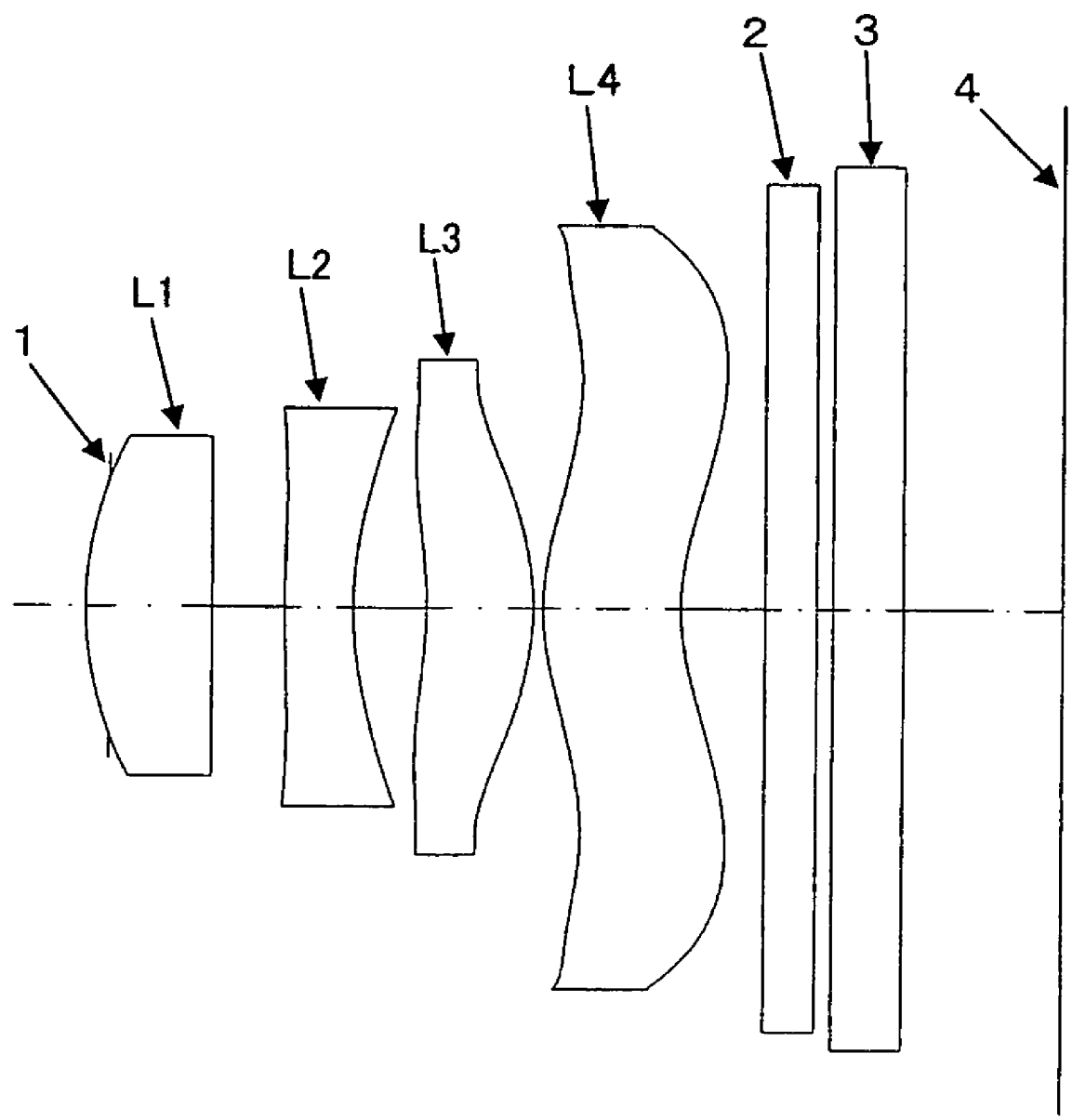
FIG. 8 shows an imaging lens array in accordance with an eighth embodiment of the present invention.
Figure 9:
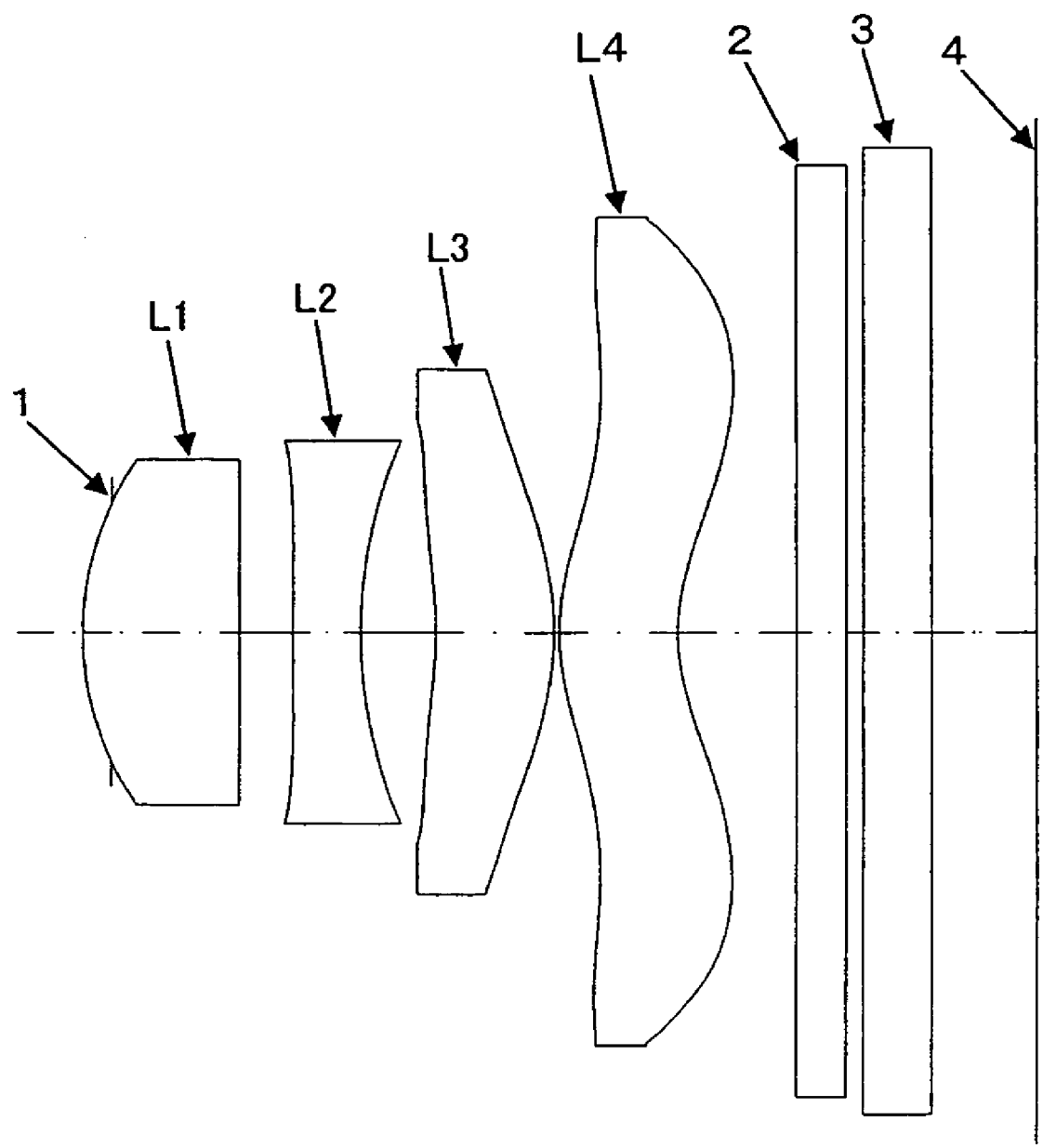
FIG. 9 shows an imaging lens array in accordance with a ninth embodiment of the present invention.

The first lens L1 in FIGS. 1-4 and 6-8 is a plano-convex lens, while the first lens L1 in FIGS. 5 and 9 is a positive meniscus lens. The second, third and fourth lenses L2, L3 and L4 are a double-sided aspherical lens made of plastic.

Figure 6:
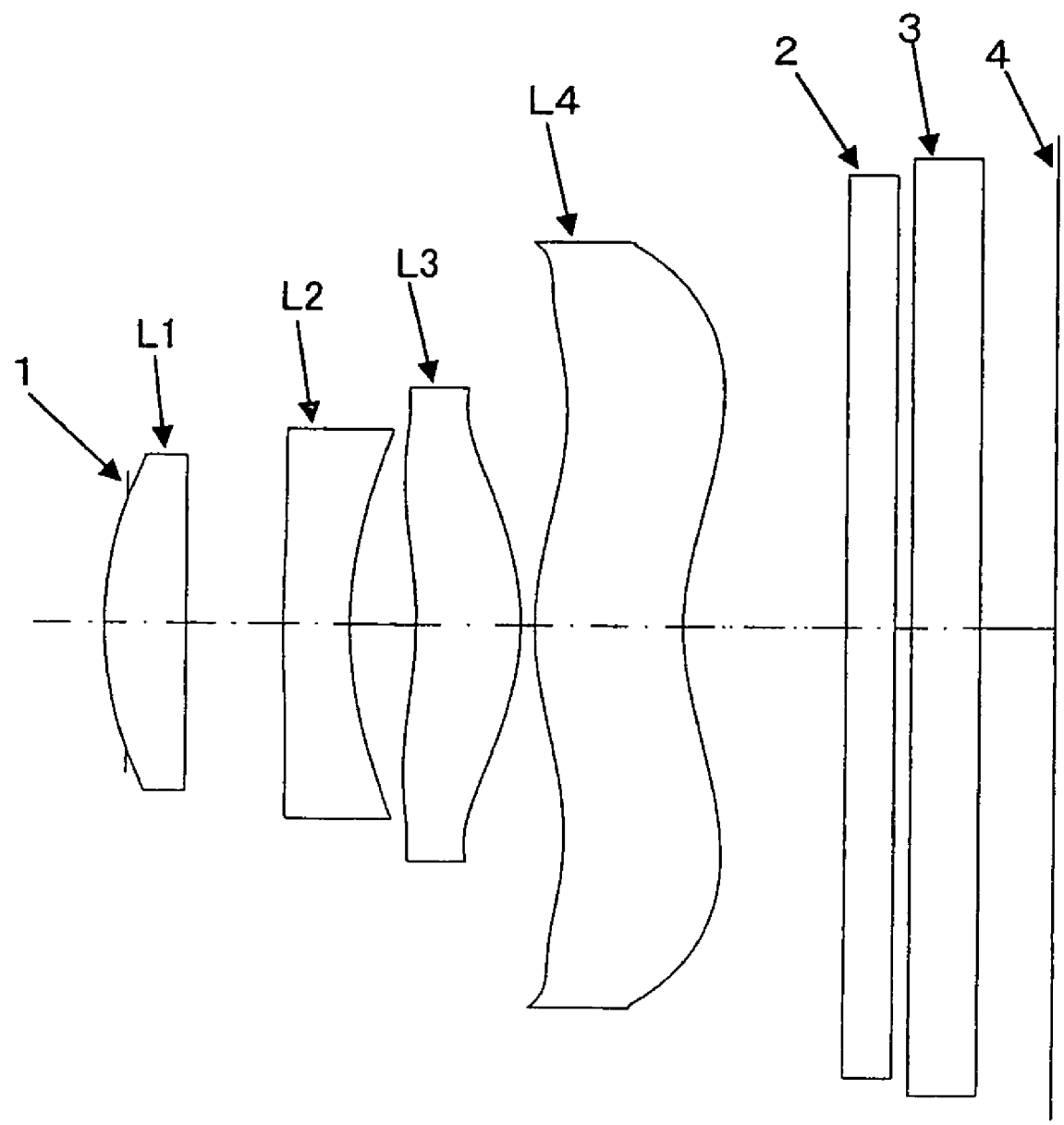
FIG. 6 shows an imaging lens array in accordance with a sixth embodiment of the present invention.

The first side of the first lens L1 in FIGS. 6-8 is aspherical and made of plastic material.

The real numerical values of the respective embodiments should be referred to the attached tables 1-9, firstly, the meaning of the letters and codes in the respective drawings are explained as follows:

Fno~F

2 ω represents the angle of view f represents the focal length of the imaging lens array The Arabic numbers 1, 2, 3 . . . 12 represent the surface number of the respective lenses from the object side. For example, the front surface and the rear surface of the first lens L1 are designated by 1 and 2, respectively. 3 and 4 represent both sides of the second lens L2, 5 and 6 represent both sides of the third lens L3, 7 and 8 represent both sides of the fourth lens L4, while 9, 10, 11 and 12 represent both sides of the parallel flat glass 2 and 3.

∞ represents the radius of curvature (mm).

d represents the thickness and its unit is mm.

The respective tales also show the spherical aberration, the astigmatic difference and the distortion aberration of the respective embodiments. The data of the d line is shown in each of the drawings, and the astigmatic difference includes the Sagittal (S) plane and the meridional (M) plane.

With reference to the tables 10A, 10B and 10C, the capital letters A, B, C and D, represent the aspherical coefficients of the respective lenses, the height of the optical axis is H, and the deflection of the optical axis is X, and then a formula will be satisfied:

$$X=(1/R)H^2/[1+(1-(1+K)(H/R)^2)^{1/2}+AH^4+BH^6+CH^8+DH^{10}+EH^{12}$$

The capital R in this formula represents the paraxial radius of curvature, K represents the conical coefficients, the aspherical coefficient E-03 represents $10^{-3}$.

The focal length of the imaging lens array of this invention is f, the focal length of the first lens L1 is f1, and the present invention can satisfy the following equation:

$$0.75<f1/f<1.25$$

When f1/f≦0.75, the power of the first lens L1 will be increased, and the aberration-correcting effect will be adversely affected, thus resulting in an overhigh sensitivity of decentration.

When f1/f≧1.25, the power of the first lens L1 will be weakened, resulting total optical length will be increased.

If the focal lengths of the second and third lenses array of this invention are f2 and f3, then the present invention can satisfy the following equation:

$$0.5<|f2|/f3<1.1$$

When |f2|/f3≦0.5, the power of the third lens L3 will be weakened, while the power of the first lens L1 will be increased, so that the second lens L2 will have a poor aberration-correction, and the peripheral performance thereof will be adversely affected.

When |f2|/f3≧1.1, it will lead to an overgreat power of the second and third lenses L2 and L3, and a poor effect of aberration-correction, making it impossible to minimizing the imaging lens array.

Furthermore, if the radius of curvature of the object-side surface of the fourth lens L4 is r7, and the radius of curvature of the image-side surface of the fourth lens L4 is r8, then the present invention can satisfy the following equation:

$$8.5<|r7+r8|/|r7-r8|/f3<16.0$$

When |r7+r8|/|r7-r8|/f3≦8.5, the power of the fourth lens L4 will be reduced, the angle of view will be reduced, the whole length and the angle of arrival of the CCD will be increased.

When |r7+r8|/|r7-r8|/f3≧16.0, the power of the fourth lens L4 will be increased, and the angle of arrival of the CCD will be reduced, causing overgreat curvature of the peripheral shape of the lens, consequently, the lens will be difficult to be produced.

It will be noted that the second, third and fourth lenses L2, L3 and L4 are made of plastic material, and if the combined focal length of the second, third and fourth lenses L2, L3 and L4 is f234, then the present invention can satisfy the equation:

$$|f234|/f>3.0°$$

The double-sided aspherical lens can be produced more easily since it is made of plastic. However, if |f234|/f<=3.0, and the lenses are made of plastic, the focus position will change sharply with the change of temperature.

The positive and negative meniscus lenses enable the imaging lens array of the present invention to have an appropriate power and ensure the performance of the respective lenses. Furthermore, the above-mentioned equations can suppress the power of the lenses, minimizing error, improving the peripheral performance of the lenses used in the solid image device, and can improve the image quality.

On the other hand, the aspherical surface with point of inflexion can be made more easily due to it is made of plastic, and since the fourth lens L4 closest to image-forming plane is a positive meniscus lens, it can reduce the angle of arrival of the CCD. Therefore, the imaging lens array of the present invention can be used on the cell phone or the digital camera.

While we have shown and described various embodiments in accordance with the present invention, it should be clear to those skilled in the art that further embodiments may be made without departing from the scope of the present invention.

TABLE 1
(1st embodiment)
focal length: f = 5.80
F NO.: F2.89
angle of view: 2ω = 61.0°
|   | r      | d    | nd      | vd   |
|---|--------|------|---------|------|
| 1 | 2.908  | 1.19 | 1.48749 | 70.4 |
| 2 | ∞      | 0.80 |         |      |
| 3 | 15.771 | 0.61 | 1.58340 | 30.2 |
| 4 | 3.392  | 0.49 |         |      |
| 5 | -2.755 | 0.95 | 1.51357 | 56.8 |
| 6 | -1.889 | 0.07 |         |      |
| 7 | 2.055  | 1.04 | 1.51357 | 56.8 |
| 8 | 1.750  | 1.00 |         |      |
| 9 | ∞      | 0.30 | 1.51680 | 64.2 |
| 10| ∞      | 0.10 |         |      |
| 11| ∞      | 0.40 | 1.51680 | 64.2 |
| 12| ∞      |      |         |      |
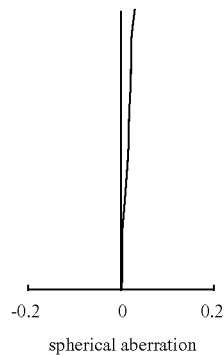
-0.2   0   0.2
spherical aberration
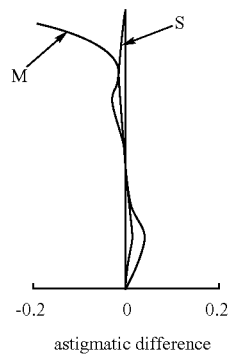
-0.2   0   0.2
astigmatic difference
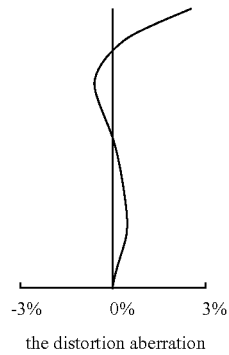
-3%   0%   3%
the distortion aberration
TABLE 2
(2nd embodiment)
focal length: f = 5.70
F NO.: F2.77
angle of view: 2ω = 61.1°
|   | r      | d    | nd      | vd   |
|---|--------|------|---------|------|
| 1 | 2.915  | 1.24 | 1.48749 | 70.4 |
| 2 | ∞      | 0.75 |         |      |
| 3 | 15.441 | 0.63 | 1.58340 | 30.2 |
| 4 | 3.657  | 0.47 |         |      |
| 5 | -3.327 | 1.01 | 1.50914 | 56.4 |
| 6 | -2.174 | 0.08 |         |      |
| 7 | 2.080  | 1.20 | 1.50914 | 56.4 |
| 8 | 1.685  | 1.00 |         |      |
| 9 | ∞      | 0.30 | 1.51680 | 64.2 |
| 10| ∞      | 0.10 |         |      |
| 11| ∞      | 0.50 | 1.51680 | 64.2 |
| 12| ∞      |      |         |      |
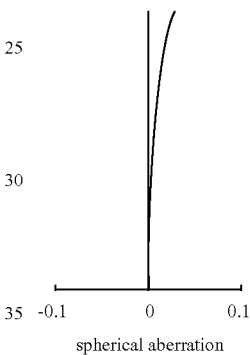
-0.1   0   0.1
spherical aberration
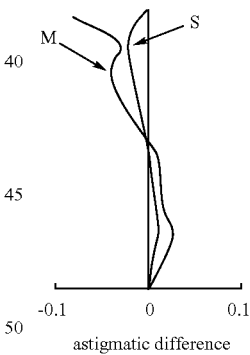
-0.1   0   0.1
astigmatic difference
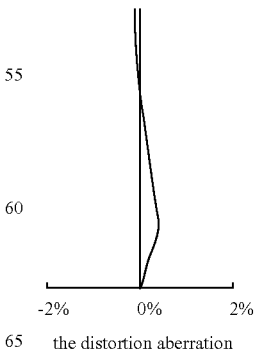
-2%   0%   2%
the distortion aberration

TABLE 3
(3rd embodiment)
focal length: f = 5.69
F NO.: F2.79
angle of view: 2 ω = 62.7°
| | r | d | nd | vd |
|---|---|---|---|---|
| 1 | 2.741 | 1.20 | 1.48749 | 70.4 |
| 2 | ∞ | 0.69 | | |
| 3 | 15.108 | 0.60 | 1.58340 | 30.2 |
| 4 | 3.554 | 0.49 | | |
| 5 | −3.043 | 0.98 | 1.51357 | 56.8 |
| 6 | −2.136 | 0.07 | | |
| 7 | 2.059 | 1.12 | 1.51357 | 56.8 |
| 8 | 1.687 | 1.00 | | |
| 9 | ∞ | 0.30 | 1.51680 | 64.2 |
| 10 | ∞ | 0.10 | | |
| 11 | ∞ | 0.50 | 1.51680 | 64.2 |
| 12 | ∞ | | | |
TABLE 4
(4th embodiment)
focal length: f = 5.75
F NO.: F2.86
angle of view: 2 ω = 62.8°
| | r | d | nd | vd |
|---|---|---|---|---|
| 1 | 2.893 | 1.04 | 1.48749 | 70.4 |
| 2 | ∞ | 0.83 | | |
| 3 | 15.447 | 0.60 | 1.58340 | 30.2 |
| 4 | 3.456 | 0.49 | | |
| 5 | −2.890 | 0.95 | 1.51357 | 56.8 |
| 6 | −1.943 | 0.11 | | |
| 7 | 2.099 | 1.09 | 1.51357 | 56.8 |
| 8 | 1.739 | 1.00 | | |
| 9 | ∞ | 0.19 | 1.51357 | 56.8 |
| 10 | ∞ | 0.10 | | |
| 11 | ∞ | 0.42 | 1.51680 | 64.2 |
| 12 | ∞ | | | |
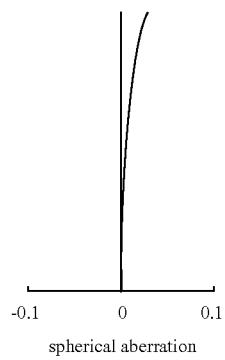
spherical aberration
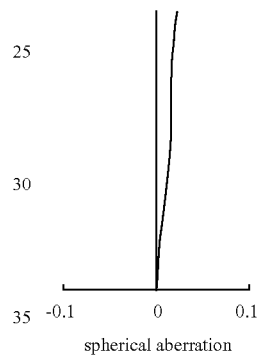
spherical aberration
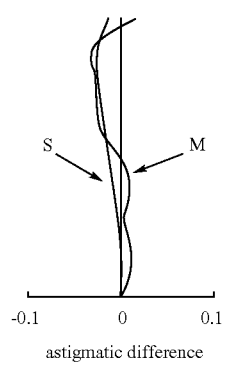
astigmatic difference
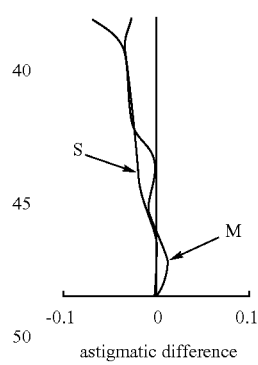
astigmatic difference
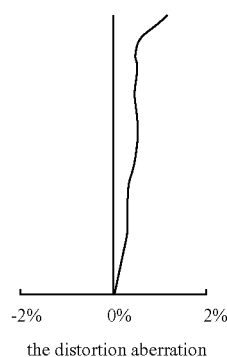
the distortion aberration
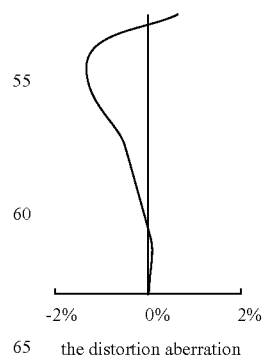
the distortion aberration TABLE 5
(5th embodiment)
focal length: f = 5.75
F NO.: F2.86
angle of view: 2 ω = 63.5°
|  | r | d | nd | vd |
|---|---|---|---|---|
| 1 | 2.923 | 1.01 | 1.48749 | 70.4 |
| 2 | 26.25522 | 0.84 | | |
| 3 | 7.352 | 0.55 | 1.58340 | 30.2 |
| 4 | 3.066 | 0.52 | | |
| 5 | −2.352 | 0.85 | 1.51357 | 56.8 |
| 6 | −1.784 | 0.07 | | |
| 7 | 2.034 | 1.10 | 1.51357 | 56.8 |
| 8 | 1.774 | 1.59 | | |
| 9 | ∞ | 0.30 | 1.51680 | 64.2 |
| 10 | ∞ | 0.10 | | |
| 11 | ∞ | 0.42 | 1.51680 | 64.2 |
| 12 | ∞ | | | |
TABLE 6
(6th embodiment)
focal length: f = 4.48
F NO.: F2.84
angle of view: 2 ω = 69.0°
|  | r | d | nd | vd |
|---|---|---|---|---|
| 1 | 2.308 | 0.49 | 1.51357 | 56.8 |
| 2 | ∞ | 0.58 | | |
| 3 | 7.393 | 0.40 | 1.58340 | 30.2 |
| 4 | 2.550 | 0.41 | | |
| 5 | −2.303 | 0.64 | 1.51357 | 56.8 |
| 6 | −1.653 | 0.09 | | |
| 7 | 1.889 | 0.90 | 1.51357 | 56.8 |
| 8 | 1.639 | 1.00 | | |
| 9 | ∞ | 0.30 | 1.51680 | 64.2 |
| 10 | ∞ | 0.10 | | |
| 11 | ∞ | 0.42 | 1.51680 | 64.2 |
| 12 | ∞ | | | |
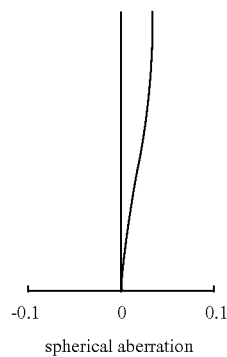
spherical aberration
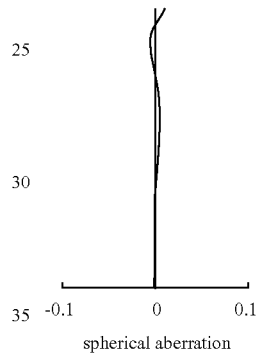
spherical aberration
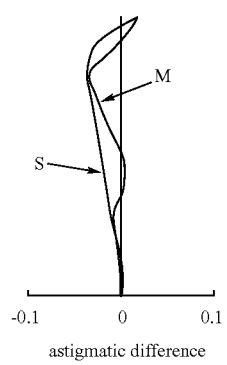
astigmatic difference
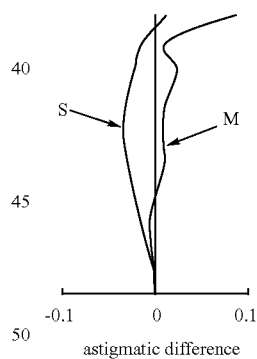
astigmatic difference
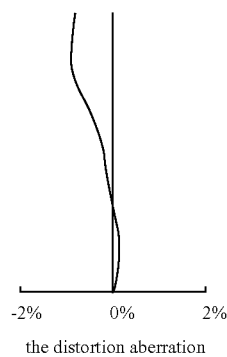
the distortion aberration
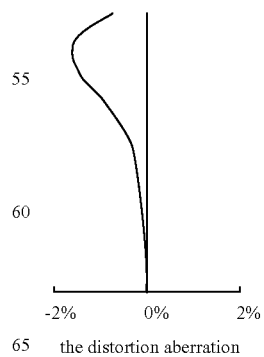
the distortion aberration

TABLE 7
(7th embodiment)
focal length: f = 3.04
F NO.: F2.82
angle of view: 2 ω = 68.0°
|    | r      | d    | nd      | νd   |
|----|--------|------|---------|------|
| 1  | 1.475  | 0.47 | 1.51357 | 56.8 |
| 2  | ∞      | 0.28 |         |      |
| 3  | 7.993  | 0.36 | 1.58340 | 30.2 |
| 4  | 1.733  | 0.24 |         |      |
| 5  | -3.533 | 0.54 | 1.51357 | 56.8 |
| 6  | -1.686 | 0.10 |         |      |
| 7  | 1.075  | 0.51 | 1.51357 | 56.8 |
| 8  | 0.939  | 0.40 |         |      |
| 9  | ∞      | 0.19 | 1.51680 | 56.8 |
| 10 | ∞      | 0.10 |         |      |
| 11 | ∞      | 0.40 | 1.51680 | 64.2 |
| 12 | ∞      |      |         |      |
TABLE 8
(8th embodiment)
focal length: f = 4.45
F NO.: F2.86
angle of view: 2 ω = 69.2°
|    | r      | d     | nd      | νd   |
|----|--------|-------|---------|------|
| 1  | 2.262  | 0.75  | 1.51497 | 63.4 |
| 2  | ∞      | 0.43  |         |      |
| 3  | 8.475  | 0.41  | 1.58340 | 30.2 |
| 4  | 2.582  | 0.43  |         |      |
| 5  | -2.262 | 0.63  | 1.51357 | 56.8 |
| 6  | -1.627 | 0.06  |         |      |
| 7  | 1.685  | 0.811 | 1.51357 | 56.8 |
| 8  | 1.462  | 0.50  |         |      |
| 9  | ∞      | 0.30  | 1.51680 | 64.2 |
| 10 | ∞      | 0.10  |         |      |
| 11 | ∞      | 0.42  | 1.51680 | 64.2 |
| 12 | ∞      |       |         |      |
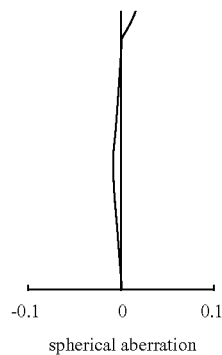
spherical aberration
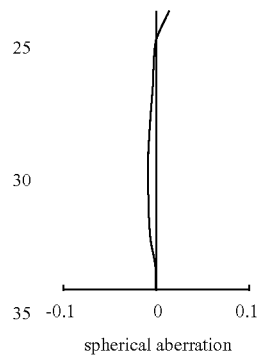
spherical aberration
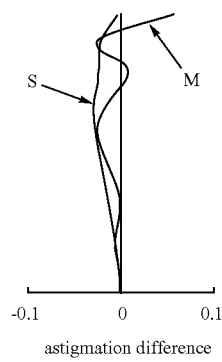
astigmation difference
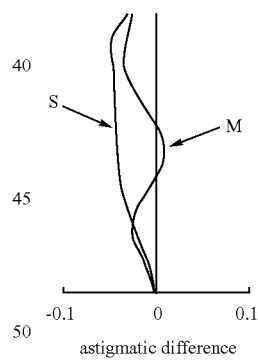
astigmatic difference
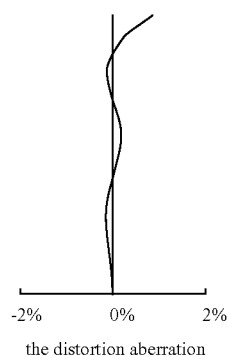
the distortion aberration
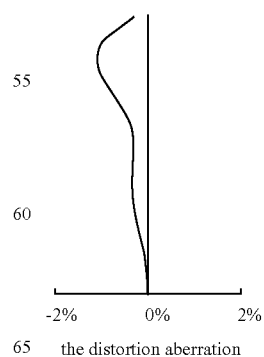
the distortion aberration

TABLE 9

(9th embodiment)
focal length: f = 4.46
F NO.: F2.83
angle of view: 2 ω = 69.6°

| | r | d | nd | νd |
|---|---|---|---|---|
| 1 | 1.916 | 0.93 | 1.48749 | 70.4 |
| 2 | 784.1965 | 0.31 | | |
| 3 | 16.103 | 0.40 | 1.58340 | 30.2 |
| 4 | 2.902 | 0.44 | | |
| 5 | −2.546 | 0.70 | 1.51357 | 56.8 |
| 6 | −1.866 | 0.03 | | |
| 7 | 1.456 | 0.71 | 1.51357 | 56.8 |
| 8 | 1.215 | 0.70 | | |
| 9 | ∞ | 0.30 | 1.51680 | 64.2 |
| 10 | ∞ | 0.10 | | |
| 11 | ∞ | 0.40 | 1.51680 | 64.2 |
| 12 | ∞ | | | |

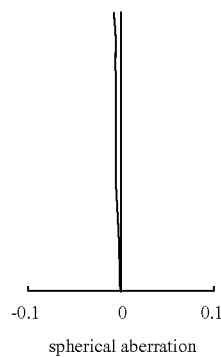

spherical aberration

TABLE 9-continued (9th embodiment)
focal length: f = 4.46
F NO.: F2.83
angle of view: 2 ω = 69.6° r    d    nd    νd

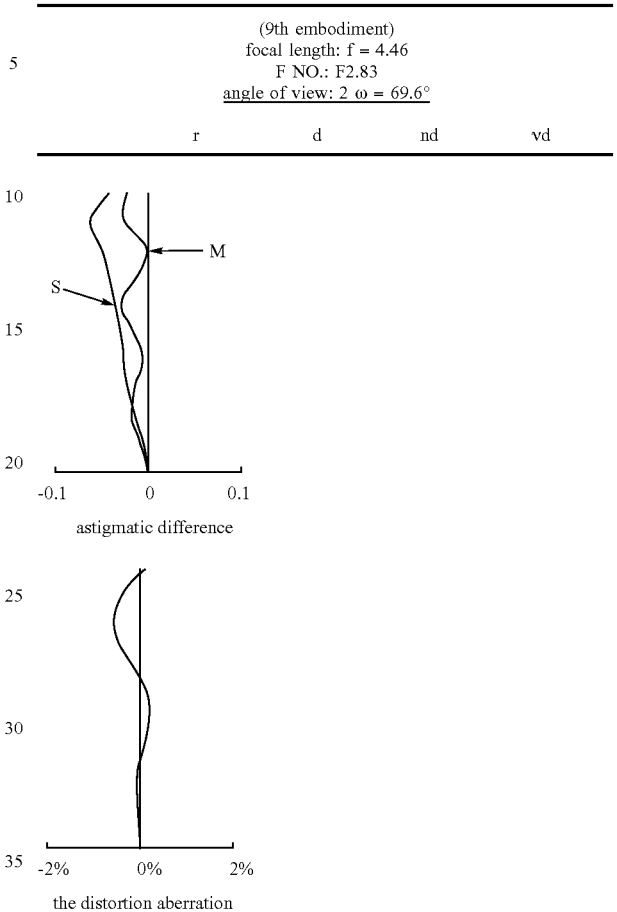

astigmatic difference the distortion aberration

TABLE 10

| | (1st embodiment) | | | | |
|---|---|---|---|---|---|
| | 3rd surface | | 4th surface | | 5th surface |
| K = | −5.26804E+02 | K = | −1.37329E+00 | K = | −2.08209E+01 |
| A = | −2.46023E−02 | A = | −8.58671E−03 | A = | 2.24533E−02 |
| B = | 2.02806E−03 | B = | −3.62896E−03 | B = | −1.16622E−04 |
| C = | −1.14810E−02 | C = | −3.48855E−04 | C = | −2.45533E−04 |
| D = | 4.65077E−03 | D = | 4.54115E−05 | D = | −1.22640E−04 |
| E = | 2.08036E−03 | E = | 4.54558E−05 | E = | −3.80965E−05 |
| | 6th surface | | 7th surface | | 8th surface |
| K = | −5.26054E+00 | K = | −2.08546E+00 | K = | −4.89242E+00 |
| A = | −2.69858E−02 | A = | −4.14850E−02 | A = | −1.83260E−02 |
| B = | −4.03557E−04 | B = | 5.42224E−03 | B = | −1.46445E−05 |
| C = | 6.24610E−03 | C = | −1.44933E−04 | C = | 1.34133E−04 |
| D = | −2.69104E−03 | D = | −4.80654E−05 | D = | −1.11767E−06 |
| E = | 8.42613E−04 | E = | −1.17181E−06 | E = | −3.95874E−06 |
| | (2nd embodiment) | | | | |
| | 3rd surface | | 4th surface | | 5th surface |
| K = | −6.37915E+02 | K = | −7.90046E−01 | K = | −3.88973E+01 |
| A = | −2.14832E−02 | A = | −6.86436E−03 | A = | 2.16673E−02 |
| B = | 4.02373E−03 | B = | −3.37063E−03 | B = | −4.11829E−04 |
| C = | −1.10665E−02 | C = | −2.71104E−04 | C = | −3.39716E−04 |
| D = | 4.42259E−03 | D = | 6.09714E−05 | D = | −1.41300E−04 |
| E = | 1.93108E−03 | E = | 5.02960E−05 | E = | −3.21602E−05 |

TABLE 10-continued

|  | 6th surface |  | 7th surface |  | 8th surface |
|---|---|---|---|---|---|
| K = | −7.26487E+00 | K = | −2.51876E+00 | K = | −4.33384E+00 |
| A = | −2.71479E−02 | A = | −3.64130E−02 | A = | −1.35942E−02 |
| B = | −2.80912E−04 | B = | 5.70830E−03 | B = | 2.02143E−04 |
| C = | 6.26604E−03 | C = | −1.31745E−04 | C = | 1.36183E−04 |
| D = | −2.69613E−03 | D = | −4.73012E−05 | D = | −1.95281E−06 |
| E = | 8.37669E−04 | E = | −1.17144E−06 | E = | −4.01991E−06 |

(3rd embodiment)

|  | 3rd surface |  | 4th surface |  | 5th surface |
|---|---|---|---|---|---|
| K = | −4.15792E+02 | K = | −7.03184E−01 | K = | −3.07975E+01 |
| A = | −2.33648E−02 | A = | −6.62708E−03 | A = | 2.19556E−02 |
| B = | 3.42146E−03 | B = | −3.32361E−03 | B = | −2.44608E−04 |
| C = | −1.09735E−02 | C = | −2.65162E−04 | C = | −2.63926E−04 |
| D = | 4.54091E−03 | D = | 5.91518E−05 | D = | −1.28097E−04 |
| E = | 1.90861E−03 | E = | 5.73411E−05 | E = | −3.60770E−05 |

|  | 6th surface |  | 7th surface |  | 8th surface |
|---|---|---|---|---|---|
| K = | −6.56501E+00 | K = | −2.86883E+00 | K = | −4.45495E+00 |
| A = | −2.72343E−02 | A = | −3.89561E−02 | A = | −1.64003E−02 |
| B = | −8.04627E−05 | B = | 5.63557E−03 | B = | 2.35748E−04 |
| C = | 6.29992E−03 | C = | −1.26039E−04 | C = | 1.30194E−04 |
| D = | −2.69610E−03 | D = | −4.64589E−05 | D = | −2.33479E−06 |
| E = | 8.37821E−04 | E = | −1.16980E−06 | E = | −4.01283E−06 |

(4th embodiment)

|  | 3rd surface |  | 4th surface |  | 5th surface |
|---|---|---|---|---|---|
| K = | −7.48681E+02 | K = | −1.30091E+00 | K = | −2.20452E+01 |
| A = | −2.47812E−02 | A = | −8.37735E−03 | A = | 2.23830E−02 |
| B = | 1.85909E−03 | B = | −3.55997E−03 | B = | −2.13557E−04 |
| C = | −1.12124E−02 | C = | −3.25407E−04 | C = | −2.65602E−04 |
| D = | 4.78790E−03 | D = | 4.57855E−05 | D = | −1.23114E−04 |
| E = | 2.11590E−03 | E = | 4.53352E−05 | E = | −4.18044E−05 |

|  | 6th surface |  | 7th surface |  | 8th surface |
|---|---|---|---|---|---|
| K = | −4.95322E+00 | K = | −2.23785E+00 | K = | −4.81371E+00 |
| A = | −2.72468E−02 | A = | −4.19354E−02 | A = | −1.83489E−02 |
| B = | −4.06807E−04 | B = | 5.40635E−03 | B = | −2.22765E−05 |
| C = | 6.24722E−03 | C = | −1.42420E−04 | C = | 1.31452E−04 |
| D = | −2.69114E−03 | D = | −4.73326E−05 | D = | −1.36038E−06 |
| E = | 8.41857E−04 | E = | −1.06855E−06 | E = | −3.96039E−06 |

(5th embodiment)

|  | 3rd surface |  | 4th surface |  | 5th surface |
|---|---|---|---|---|---|
| K = | −1.04614E+02 | K = | −3.17229E+00 | K = | −1.90349E+01 |
| A = | −2.71361E−02 | A = | −1.15611E−02 | A = | 2.39068E−02 |
| B = | 6.54771E−04 | B = | −4.04918E−03 | B = | −1.73217E−03 |
| C = | −1.08373E−02 | C = | −5.80632E−04 | C = | −3.79435E−04 |
| D = | 5.05919E−03 | D = | 1.52421E−05 | D = | −1.16161E−04 |
| E = | 2.16851E−03 | E = | 8.28348E−05 | E = | −6.06502E−05 |

|  | 6th surface |  | 7th surface |  | 8th surface |
|---|---|---|---|---|---|
| K = | −4.70328E+00 | K = | −3.91726E+00 | K = | −5.54479E+00 |
| A = | −3.14968E−02 | A = | −3.43193E−02 | A = | −1.82709E−02 |
| B = | 3.22877E−04 | B = | 5.48182E−03 | B = | 7.75512E−04 |
| C = | 6.65449E−03 | C = | −1.09894E−04 | C = | 9.72572E−05 |
| D = | −2.63909E−03 | D = | −4.30085E−05 | D = | −1.82852E−06 |
| E = | 8.38951E−04 | E = | −1.10962E−06 | E = | −3.65992E−06 |

(6th embodiment)

|  | 1st surface |  | 3rd surface |  | 4th surface |  | 5th surface |
|---|---|---|---|---|---|---|---|
| K = | 3.71436E−01 | K = | −1.82009E+02 | K = | −1.66589E+00 | K = | −2.79942E+01 |
| A = | −2.95478E−03 | A = | −3.23554E−02 | A = | −8.20442E−03 | A = | 6.44674E−02 |
| B = | −1.05267E−02 | B = | 5.20876E−03 | B = | −3.16253E−03 | B = | −5.13112E−03 |
| C = | 2.12398E−02 | C = | −9.43534E−03 | C = | 9.17974E−05 | C = | −3.12544E−03 |

TABLE 10-continued

| | | | | | | | |
|---|---|---|---|---|---|---|---|
| D = | −2.27011E−02 | D = | 3.43041E−03 | D = | 9.93822E−05 | D = | 2.50184E−04 |
| E = | 4.11658E−03 | E = | 6.89730E−03 | E = | 8.85397E−06 | E = | 3.38267E−04 |

| | 6th surface | 7th surface | 8th surface |
|---|---|---|---|
| K = | −5.78315E+00 | K = −6.51192E+00 | K = −6.90178E+00 |
| A = | −3.29006E−02 | A = −4.86944E−02 | A = −3.15995E−02 |
| B = | 8.25066E−03 | B = 3.74747E−03 | B = 2.58908E−04 |
| C = | 1.05587E−02 | C = −1.17549E−04 | C = 8.55969E−05 |
| D = | −1.99456E−03 | D = 4.14941E−05 | D = −8.24757E−06 |
| E = | 8.64121E−04 | E = 2.12093E−05 | E = −4.77638E−06 |

(7th embodiment)

| | 1st surface | 3rd surface | 4th surface | 5th surface |
|---|---|---|---|---|
| K = | 8.82765E−02 | K = −3.12555E+02 | K = −1.84471E+00 | K = −1.87145E+02 |
| A = | 8.92419E−03 | A = −1.31375E−01 | A = −3.05365E−02 | A = 1.78291E−01 |
| B = | −4.81718E−02 | B = −4.43204E−02 | B = −4.04520E−02 | B = −5.16820E−02 |
| C = | 2.01265E−01 | C = −9.15747E−02 | C = −1.09029E−02 | C = −3.08684E−02 |
| D = | −1.69141E−01 | D = 1.94310E−01 | D = 4.22890E−03 | D = 1.54450E−02 |
| E = | 2.06989E−01 | E = 4.02723E−01 | E = 3.80368E−02 | E = 4.91296E−02 |

| | 6th surface | 7th surface | 8th surface |
|---|---|---|---|
| K = | −7.28073E+00 | K = −5.42760E+00 | K = −4.74782E+00 |
| A = | −1.05140E−01 | A = −1.66507E−01 | A = −1.07326E−01 |
| B = | 5.73462E−02 | B = 2.67826E−02 | B = 4.55364E−03 |
| C = | 1.48394E−01 | C = −1.34648E−03 | C = 1.88685E−03 |
| D = | −7.60987E−02 | D = 1.45712E−03 | D = −5.79219E−04 |
| E = | 5.95146E−02 | E = 1.50781E−03 | E = −2.84163E−04 |

(8th embodiment)

| | 1st surface | 3rd surface | 4th surface | 5th surface |
|---|---|---|---|---|
| K = | 6.19951E−02 | K = −2.39209E+02 | K = −1.93237E+00 | K = −3.19001E+01 |
| A = | 2.10301E−03 | A = −3.46129E−02 | A = −1.09124E−02 | A = 5.93873E−02 |
| B = | −8.17608E−03 | B = −2.95655E−03 | B = −4.11074E−03 | B = −5.06201E−03 |
| C = | 1.05443E−02 | C = −5.09685E−03 | C = 5.70143E−04 | C = −2.65574E−03 |
| D = | −1.06917E−02 | D = 8.43749E−03 | D = 5.27092E−04 | D = −1.23475E−04 |
| E = | 3.45881E−03 | E = 5.37636E−03 | E = 6.20942E−04 | E = 3.58716E−04 |

| | 6th surface | 7th surface | 8th surface |
|---|---|---|---|
| K = | −6.52459E+00 | K = −5.53358E+00 | K = −6.35146E+00 |
| A = | −3.26228E−02 | A = −4.95680E−02 | A = −3.21391E−02 |
| B = | 7.90673E−03 | B = 3.67635E−03 | B = 3.18920E−04 |
| C = | 9.84883E−03 | C = −1.05621E−04 | C = 8.52856E−05 |
| D = | −2.02124E−03 | D = 3.78924E−05 | D = −1.45006E−05 |
| E = | 8.29087E−04 | E = 1.98633E−05 | E = −3.85142E−06 |

(9th embodiment)

| | 3rd surface | 4th surface | 5th surface |
|---|---|---|---|
| K = | −1.08106E+03 | K = −9.23020E−01 | K = −4.23311E+01 |
| A = | −3.99806E−02 | A = −4.57796E−03 | A = 5.99969E−02 |
| B = | 7.62930E−03 | B = −6.75783E−03 | B = −1.96583E−02 |
| C = | −1.95259E−02 | C = 3.33122E−03 | C = −3.02127E−03 |
| D = | 2.00162E−02 | D = 2.39782E−03 | D = 2.20817E−04 |
| E = | 6.81304E−03 | E = 7.87820E−04 | E = 2.41661E−04 |

| | 6th surface | 7th surface | 8th surface |
|---|---|---|---|
| K = | −8.62105E+00 | K = −4.64846E+00 | K = −4.81857E+00 |
| A = | −3.55656E−02 | A = −7.03300E−02 | A = −4.36411E−02 |
| B = | 1.14445E−02 | B = 1.18724E−02 | B = 3.31239E−03 |
| C = | 1.46541E−02 | C = −8.06664E−05 | C = 8.90750E−06 |
| D = | −1.01181E−02 | D = −1.39327E−04 | D = −2.04199E−05 |
| E = | 3.22784E−03 | E = −6.44169E−06 | E = −1.36208E−05 |

TABLE 11

|  | 1st embodiment | 2nd embodiment | 3rd embodiment | 4th embodiment | 5th embodiment |
|---|---|---|---|---|---|
| $f_1/f$ | 1.03 | 1.05 | 0.99 | 1.03 | 1.16 |
| $|f_2|/f_3$ | 0.88 | 0.88 | 0.80 | 0.90 | 0.99 |
| $|r_7 + r_8|/|r_7 - r_8|$ | 12.49 | 9.52 | 10.05 | 10.67 | 14.65 |
| $|f_{234}|/f$ | 7.13 | 13.99 | 1752.21 | 8.90 | 4.07 |

|  | 6th embodiment | 7th embodiment | 8th embodiment | 9th embodiment |
|---|---|---|---|---|
| $f_1/f$ | 1.00 | 0.94 | 0.99 | 0.88 |
| $|f_2|/f_3$ | 0.80 | 0.68 | −0.78 | 0.61 |
| $|r_7 + r_8|/|r_7 - r_8|$ | 14.12 | 14.81 | 14.10 | 11.11 |
| $|f_{234}|/f$ | 44.18 | 10.23 | 78.88 | 5.09 |

What is claimed is:

1. An imaging lens array comprising, from object side, an aperture, a first lens, a second lens, a third lens and a fourth lens; and wherein
   the first lens is a positive meniscus lens with a convex surface facing the object side;
   the second lens is a negative meniscus type double-sided aspherical lens with a convex surface facing the object side;
   the third lens is a positive meniscus type double-sided aspherical lens with a convex surface facing image side; and
   the fourth lens is a positive meniscus type double-sided aspherical lens with a convex surface facing the object side.

2. The imaging lens array as claimed in claim 1, wherein a focal length of the imaging lens array is f, a focal length of the first lens is f1, a focal length of the second lens is f2, a focal length of the third lens is f3, and they satisfy an equation as:

$0.75 < f1/f < 1.25$.

3. The imaging lens array as claimed in claim 1, wherein the focal lengths of the second and third lenses are f2 and f3, and they satisfy an equation as:

$0.5 < |f2|/f3 < 1.1$.

4. The imaging lens array as claimed in claim 2, wherein the focal lengths of the second and third lenses are f2 and f3, and they satisfy an equation as:

$0.5 < |f2|/f3 < 1.1$.

5. The imaging lens array as claimed in claim 1, wherein a radius of curvature of the object-side surface of the fourth lens is r7, and a radius of curvature of the image-side surface of the fourth lens is r8, then the present invention can satisfy the equation:

$8.5 < |r7+r8|/|r7-r8| \cdot f3 < 16.0$.

6. The imaging lens array as claimed in claim 3, wherein a radius of curvature of the object-side surface of the fourth lens is r7, and a radius of curvature of the image-side surface of the fourth lens is r8, then the present invention can satisfy the equation:

$8.5 < |r7+r8|/|r7-r8| \cdot f3 < 16.0$.

7. The imaging lens array as claimed in claim 1, wherein the second, third and fourth lenses are made of plastic, and a combined focal length of the second, third and fourth lenses is f234, then the present invention can satisfy the equation:

$|f234|/f > 3.0°$.

8. An imaging lens array comprising, from object side, an aperture, a first lens, a second lens, a third lens and a fourth lens; and
   wherein
   the first lens is a piano-convex lens with a convex surface facing the object side;
   the second lens is a negative meniscus type double-sided aspherical lens with a convex surface facing the object side;
   the third lens is a positive meniscus type double-sided aspherical lens with a convex surface facing image side; and
   the fourth lens is a positive meniscus type double-sided aspherical lens with a convex surface facing the object side.

9. The imaging lens array as claimed in claim 8, wherein a focal length of the imaging lens array is f, a focal length of the first lens is f1, a focal length of the second lens is f2, a focal length of the third lens is f3, and they satisfy an equation as:

$0.75 < f1/f < 1.25$.

10. The imaging lens array as claimed in claim 8, wherein the focal lengths of the second and third lenses are f2 and f3, and they satisfy an equation as:

$0.5 < |f2|/f3 < 1.1$.

11. The imaging lens array as claimed in claim 8, wherein a radius of curvature of the object-side surface of the fourth lens is r7, and a radius of curvature of the image-side surface of the fourth lens is r8, then the present invention can satisfy the equation:

$8.5 < |r7+r8|/|r7-r8| \cdot f3 < 16.0$.

12. The imaging lens array as claimed in claim 8, wherein the second, third and fourth lenses are made of plastic, and a combined focal length of the second, third and fourth lenses is f234, then the present invention can satisfy the equation:

$|f234|/f > 3.0°$.

* * * * *